United States Patent
Kaminade

(10) Patent No.: US 9,988,045 B2
(45) Date of Patent: Jun. 5, 2018

(54) DRIVING SUPPORT DEVICE AND DRIVING SUPPORT METHOD

(71) Applicant: TOYOTA JIDOSHA KABUSHIKI KAISHA, Toyota-shi, Aichi-ken (JP)

(72) Inventor: Takuya Kaminade, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 310 days.

(21) Appl. No.: 14/817,701

(22) Filed: Aug. 4, 2015

(65) Prior Publication Data

US 2016/0039410 A1    Feb. 11, 2016

(30) Foreign Application Priority Data

Aug. 8, 2014    (JP) .................. 2014-162415

(51) Int. Cl.
| | | |
|---|---|---|
| *G01M 17/00* | (2006.01) | |
| *B60W 30/08* | (2012.01) | |
| *G08G 1/16* | (2006.01) | |
| *B60Q 1/46* | (2006.01) | |
| *B60R 21/01* | (2006.01) | |

(52) U.S. Cl.
CPC .............. *B60W 30/08* (2013.01); *B60Q 1/46* (2013.01); *B60R 21/01* (2013.01); *G08G 1/166* (2013.01); *G08G 1/167* (2013.01); *B60W 2550/10* (2013.01); *B60W 2550/20* (2013.01)

(58) Field of Classification Search
CPC ........... G01S 13/931; G01S 2013/9353; G01S 2013/9332; G01S 13/34; G01S 13/723; G01S 13/867; G01S 17/026; G01S 2013/9385; G01S 2013/9346; G01S 2013/9389; G01S 7/354; G01S 7/4802; G01S 7/4814
See application file for complete search history.

(56) References Cited

U.S. PATENT DOCUMENTS

| | | | |
|---|---|---|---|
| 2013/0253815 A1* | 9/2013 | Orfila ..................... | G08G 1/166 701/301 |
| 2014/0297171 A1* | 10/2014 | Minemura ............. | G08G 1/166 701/301 |

FOREIGN PATENT DOCUMENTS

| | | |
|---|---|---|
| EP | 2 284 047 A1 | 2/2011 |
| JP | 2004-302621 A | 10/2004 |
| JP | 2005-231450 A | 9/2005 |
| JP | 2010-018230 A | 1/2010 |
| JP | 2011-227587 A | 11/2011 |
| JP | 2012-088904 A | 5/2012 |

* cited by examiner

*Primary Examiner* — Redhwan K Mawari
(74) *Attorney, Agent, or Firm* — Sughrue Mion, PLLC

(57) ABSTRACT

A driving support device for a host vehicle that travels on a first road and makes a direction change, at a junction between the first road and a second road, by turning right or left is provided. The driving support device includes: a front detection unit configured to detect an object in front of the host vehicle; a recognition unit configured to recognize a state of another vehicle that travels on the second road toward the junction and that follows the host vehicle after the host vehicle completes the direction change, based on a detection result of the front detection unit obtained before or during the direction change; and a support determination unit configured to determine whether the host vehicle needs a rear-side support in relation to the state of the other vehicle, based on a recognition result of the recognition unit.

9 Claims, 10 Drawing Sheets

DRIVING SUPPORT DEVICE AND DRIVING SUPPORT METHOD

INCORPORATION BY REFERENCE

The disclosure of Japanese Patent Application No. 2014-162415 filed on Aug. 8, 2014 including the specification, drawings and abstract is incorporated herein by reference in its entirety.

BACKGROUND OF THE INVENTION

1. Field of the Invention

The invention relates to a driving support device and a driving support method.

2. Description of Related Art

A driving support device is described In Japanese Patent Application 2010-18230 (JP 2010-18230). When a host vehicle enters an intersection, the driving support device determines whether it is possible for the host vehicle to avoid a collision with another vehicle using an estimated amount of time before the collision, which is so called "Time-to-Collision (TTC)", and activates an airbag in a case where it is impossible for the host vehicle to avoid the collision. The driving support device uses information detected by a front radar to determine whether it is possible for the host vehicle to avoid a collision with a preceding vehicle, and uses information detected by a rear radar to determine whether it is possible for the host vehicle to avoid a collision with a following vehicle.

If the host vehicle traveling on a first road makes a direction change by turning right or left at a junction between the first road and a second road to enter the second road from the first road, the host vehicle will be followed by another vehicle traveling on the second road as a following vehicle. When the host vehicle enters the second road by turning right or left, a difference between a speed of the host vehicle immediately after the direction change and a speed of the other vehicle traveling on the second road toward the junction may be large and the other vehicle may get close to the host vehicle after the host vehicle completes the direction change. In this case, the driving support device described in JP 2010-18230 A uses information detected by the rear radar to determine whether the host vehicle needs a rear-side support for avoiding a collision with the other vehicle as the following vehicle. However, a detection range of the rear radar is limited to an area in the rear of the host vehicle, so the following vehicle will be detected only after the host vehicle enters the second road. This may cause a delay of a timing at which the rear-side support in relation to the following vehicle is provided.

SUMMARY OF THE INVENTION

The invention provides a driving support device and a driving support method that makes it possible to provide the rear-side support for the host vehicle in relation to another vehicle traveling on the second road earlier when the host vehicle makes the direction change by turning right or left and enters the second road from the first road.

A first aspect of the invention relates to a driving support device for a host vehicle that travels on a first road and makes a direction change, at a junction between the first road and a second road, by turning right or left to enter the second road from the first road. The driving support device includes: a front detection unit configured to detect an object in front of the host vehicle; a recognition unit configured to recognize a state of another vehicle that travels on the second road toward the junction and that follows the host vehicle as a following vehicle after the host vehicle completes the direction change, based on a detection result of the front detection unit obtained before or during the direction change; and a support determination unit configured to determine whether the host vehicle needs a rear-side support in relation to the state of the other vehicle, based on a recognition result of the recognition unit. The driving support device may further include a support unit configured to provide the rear-side support when the support determination unit determines that the host vehicle needs the rear-side support.

The recognition unit in the above driving support device recognizes the state of the other vehicle, which becomes the following vehicle of the host vehicle after the host vehicle completes the direction change, based on the detection result of the front detection unit obtained before or during the direction change. Thus, the state of the other vehicle can be recognized earlier as compared to a case where the state of the other vehicle is recognized by a detection unit with a detection range set in the rear of the host vehicle. Then, the support determination unit determines whether the host vehicle needs the rear-side support in relation to the state of the other vehicle, based on the recognition result of the other vehicle recognition unit. Thus, the state of the other vehicle recognized earlier is used to determine whether the host vehicle needs the rear-side support. This makes it possible to determine whether the host vehicle needs the rear-side support earlier. As a result, the rear-side support can be provided earlier.

The driving support device may further include a rear detection unit configured to detect an object in a rear of the host vehicle. In this case, the recognition unit may be configured to recognize the state of the other vehicle, based on the detection result of the front detection unit obtained before or during the direction change and a detection result of the rear detection unit obtained after the direction change. With the above configuration, the recognition unit can obtain more information about an object as compared with a case where the recognition unit uses only the detection result of the front detection unit. Thus, accuracy in recognizing the other vehicle is increased.

The rear detection unit may be configured to periodically detect the object in the rear of the host vehicle at a predetermined interval, and the recognition unit may be configured to count a successive detection number as the number of times the rear detection unit detects the other vehicle successively. In this case, the support determination unit may be configured to determine that the host vehicle needs the rear-side support at least when a condition that the successive detection number is larger than a first threshold is satisfied in a case where the recognition unit does not recognizes that the other vehicle is present based on the detection result of the front detection unit, and to determine that the host vehicle needs the rear-side support at least when a condition that the successive detection number is larger than a second threshold is satisfied in a case where the recognition unit recognizes that the other vehicle is present based on the detection result of the front detection unit. The second threshold may be smaller than the first threshold.

When the recognition unit has recognized the other vehicle before based on the detection result of the front detection unit, it can be assumed that the other vehicle is detected with a certain degree of reliability. Thus, in this case, the threshold of the successive detection number, which serves as the threshold for performing the rear-side support, is reduced in the above configuration. This makes it possible to provide the rear-side support earlier as compared before the threshold of the successive detection number is changed.

The rear-side support may be a support that operates one of the host vehicle and an in-vehicle device mounted in the host vehicle before contact between the host vehicle and the other vehicle so as to avoid the contact or reduce an impact of the contact. Further, the rear-side support for the host vehicle may include at least one of a control to turn on a hazard lamp, a control to adjust a position of a headrest to a rear-side support corresponding position, an activation preparation control for an airbag, and a seat belt pretensioner control. When the hazard lamp is turned on in the rear-side support, a driver of a following vehicle is notified of a presence of the host vehicle. This can lead the driver of the following vehicle to avoid the contact. The impact at the time of the contact between the host vehicle and the following vehicle can be reduced by performing at least one of the position adjustment control of the headrest to the rear-side support corresponding position, the activation preparation control for the airbag, and the seat belt pretensioner control in the rear-side support.

The state of the other vehicle may include an estimated amount of time before contact between the host vehicle and the other vehicle. In this case, the support determination unit may be configured to determine that the host vehicle needs the rear-side support at least when a condition that the estimated amount of time before the contact is smaller than a predetermined threshold is satisfied. With the above configuration, the estimated amount of time before the contact with the other vehicle is used to determine whether the host vehicle needs the rear-side support, and thus the timing at which the rear-side support is provided can be determined.

The driving support device may further include a direction change determination unit configured to determine whether the host vehicle is making the direction change. In this case, the direction change determination unit may be configured to determine whether the host vehicle is making the direction change based on information indicating turn signal operation and information indicating a steering angle. With the above configuration, the turn signal operation information and the steering angle information is used to determine whether the host vehicle is making the direction change, and thus the determination as to whether the host vehicle is making the direction change can be made more appropriately, as compared with a case where only the turn signal operation information is used.

A second aspect of the invention relates to a driving support method for a host vehicle that travels on a first road and makes a direction change, at a junction between the first road and a second road, by turning right or left to enter the second road from the first road. The driving support method includes: detecting an object in front of the host vehicle; recognizing a state of another vehicle that travels on the second road toward the junction and that follows the host vehicle as a following vehicle after the host vehicle completes the direction change, based on a result of detecting the object obtained before or during the direction change; and determining whether the host vehicle needs a rear-side support in relation to the state of the other vehicle, based on a result of recognizing the state of the other vehicle. The driving support method may further include providing the rear-side support when it is determined that the host vehicle needs the rear-side support.

The above driving support method makes it possible to provide the rear-side support for the host vehicle in relation to the other vehicle traveling on the second road earlier when the host vehicle makes the direction change by turning right or left and enters the second road from the first road.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention are described hereinafter with reference to the drawings. In the following description, the same reference sign is assigned to the same or corresponding element, and duplicate explanations will be omitted.

Figure 1:
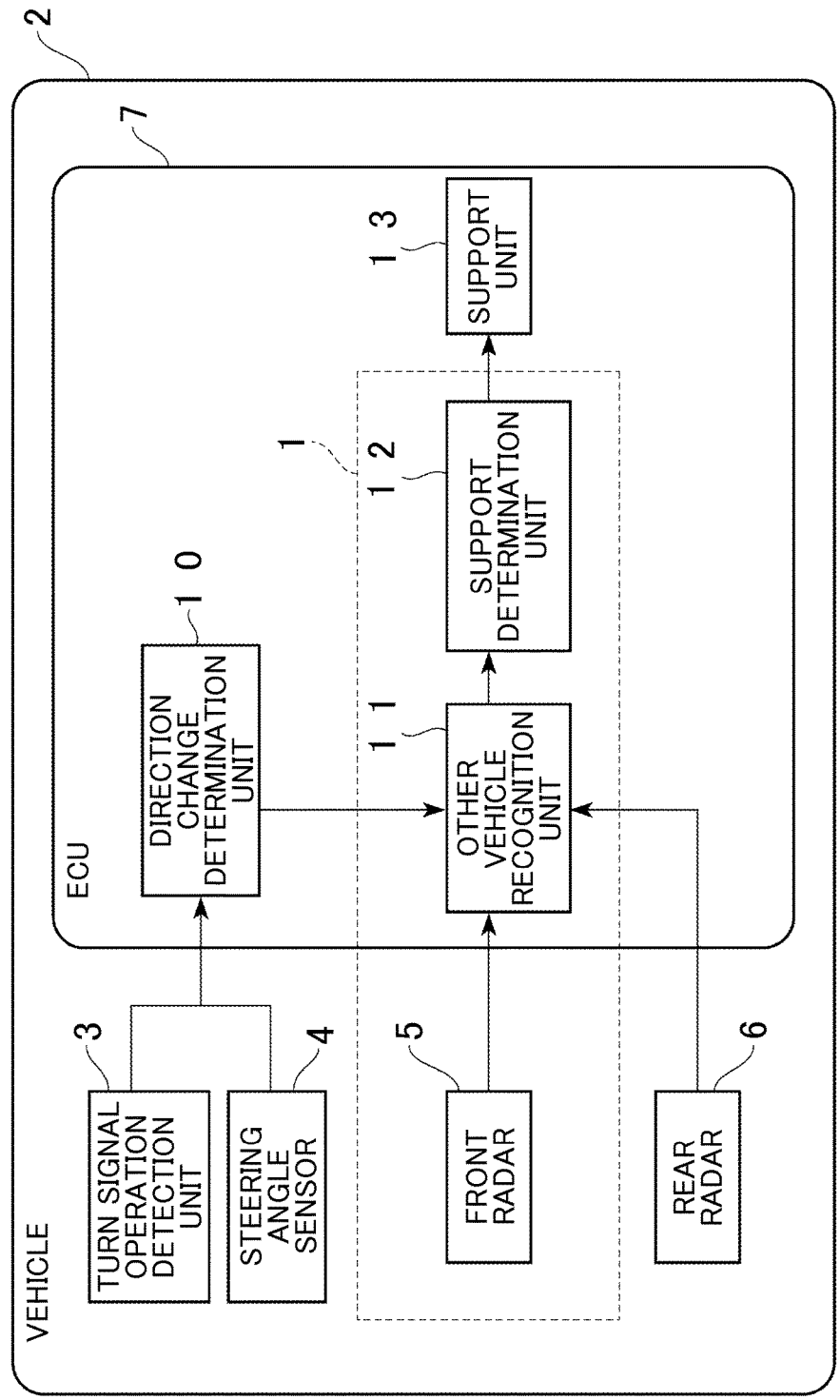
FIG. 1 is a schematic diagram that illustrates functions of a driving support device according to a first embodiment.

FIG. 1 is a schematic diagram of a driving support device according to a first embodiment. The driving support device 1 shown in FIG. 1 is a device that provides a rear-side support for a host vehicle 2. The rear-side support refers to a support that recognizes an object approaching the host vehicle 2 from behind, and that operates, before contact between the host vehicle and the object, one of the host vehicle 2 and an in-vehicle device mounted in the host vehicle 2 so as to avoid the contact or reduce an impact of the contact. The rear-side support includes, specifically, a control to turn on a hazard lamp (to blink a light), a control to adjust a position of a headrest to a rear-side support corresponding position, an activation preparation control for an airbag, and a seat belt pretensioner control. The rear-side support corresponding position of the head rest is a predetermined position at which the headrest is positioned for reducing an impact to be acted on a seated passenger at a time of rear-end contact with another vehicle. A distance between the seated passenger and the head rest is reduced by adjusting the position of the headrest to the rear-side support corresponding position. The activation preparation control for an airbag is, for example, a seat adjustment control for positioning the seated passenger in an appropriate position so that the seated passenger receives a benefit of the airbag. When the hazard lamp is turned on in the rear-side support, a driver of a following vehicle is notified of a presence of the host vehicle. This can lead the driver of the following vehicle to avoid the contact. The impact at the time of the contact between the host vehicle and the following vehicle can be reduced by the position adjustment control of the headrest to the rear-side support corresponding position, the activation preparation control for the airbag, or the seat belt pretensioner control, which is provided as the rear-side support.

Figure 2A:
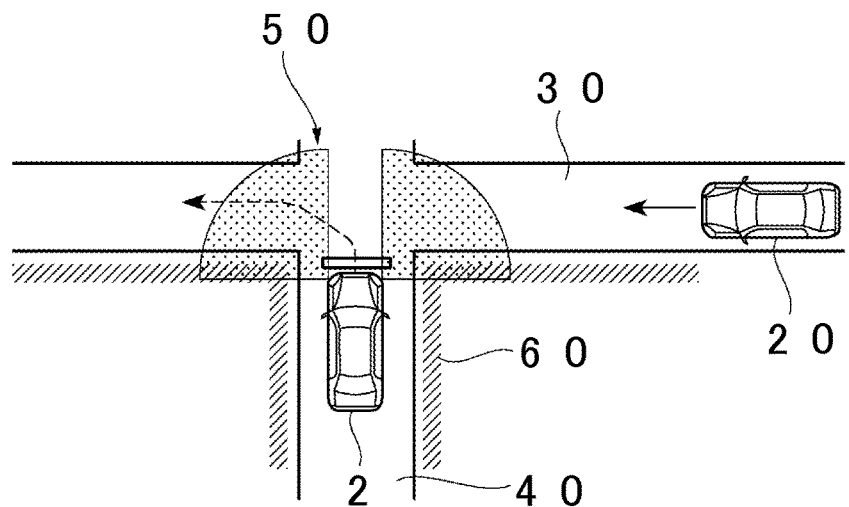
FIGS. 2A and 2B are illustrations that show a scene in which a support is provided by the driving support device shown in FIG. 1.
Figure 2B:
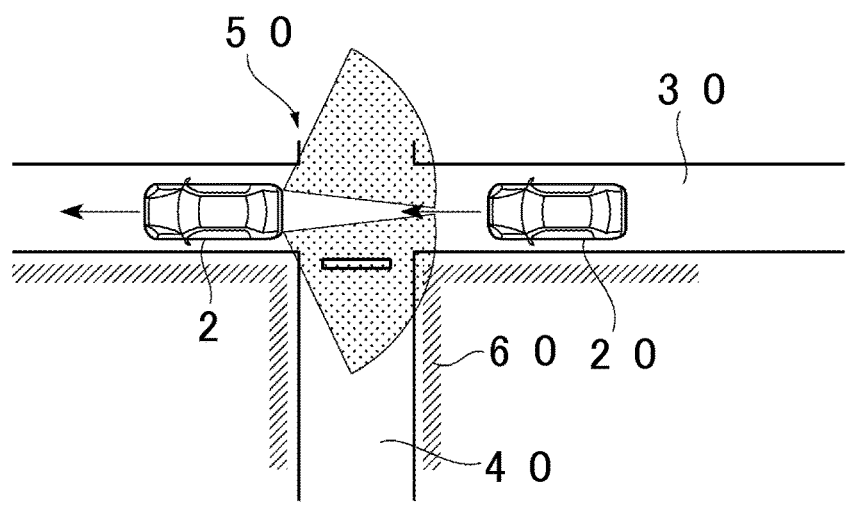

First, a scene in which the driving support device 1 works will be outlined using FIGS. 2A and 2B. FIGS. 2A and 2B show a scene at an intersection (a junction) 50 at which a priority road (a second road) 30 and a non-priority road (a first road) 40 are joined to each other. Here, the host vehicle 2 will make a direction change by turning left to enter the priority road 30 from the non-priority road 40. At this time, another vehicle 20 is traveling on the priority road 30 toward the intersection 50. The other vehicle 20 is not a following vehicle that follows the host vehicle 2 before the host vehicle 2 makes the direction change by turning left. As shown in FIG. 2B, on the other hand, the other vehicle 20 will become the following vehicle of the host vehicle 2 and approach host vehicle 2 from behind after the host vehicle 2 completes the direction change by turning left. In this way, the driving support device 1 recognizes a state of the other vehicle 20, as the following vehicle after the direction change, and provides the rear-side support for the host vehicle 2.

Back to FIG. 1, the host vehicle 2 includes a turn signal operation detection unit 3, a steering angle sensor 4, a front radar 5, a rear radar 6, and an electronic control unit (ECU) 7.

The turn signal operation detection unit 3 is provided for a turn signal lever of the host vehicle 2 and detects a driver's operation performed on the turn signal lever as turn signal operation information, for example. The turn signal operation information includes information indicating whether the driver's operation performed on the turn signal lever is an operation for turning on a right turn signal or an operation for turning on a left turn signal, and information indicating a driver's operation for turning off the turn signal, for example. The turn signal operation detection unit 3 outputs the detected turn signal operation information to the ECU 7.

The steering angle sensor 4 is provided for a steering shaft of the host vehicle 2 and detects a steering angle when the driver operates a steering wheel as steering angle information, for example. The steering angle sensor 4 outputs the detected steering angle information to the ECU 7. The steering angle information is information about steering of the host vehicle 2, and includes information indicating the steering angle.

The front radar (a front detection unit) 5 is a sensor that detects an object in front of the host vehicle 2. The "front" side here is a side where a front end of a vehicle body is positioned when viewed from a driver's seat. In other words, the "front" side is a side where the front end of the vehicle body is positioned with respect to a vertical plane that passes through the center of the vehicle body and extends in a vehicle width direction of the host vehicle 2. A detection angle of the front radar 5 can be varied up to ±90 degrees with a vehicle body length direction set as a reference direction (0 degree, taking the right side of the vehicle body length direction as a positive angle side). The front radar 5 is a millimeter-wave radar, for example. A plurality of millimeter-wave radars may be combined as the front radar 5. When the millimeter-wave radar is employed as the front radar 5, the millimeter-wave radar is provided on the front end of the host vehicle 2. The millimeter-wave radar detects an object in front of the host vehicle 2 using millimeter radio waves. The millimeter-wave radar detects an object such as another vehicle by transmitting millimeter radio waves in front of the host vehicle 2 and receiving millimeter radio waves reflected by the object. The millimeter-wave radar may instead be provided on a side surface of the host vehicle 2 near the front end, which allows to detect an object in an obliquely front side area of the host vehicle 2. FIG. 2A shows an example of a detection range of front radar 5 of the host vehicle 2. In this example, two millimeter-wave radars are provided on the both side surfaces of the host vehicle 2 near the front end, and each radar has the detection range of the detection angle from approximately −90 degrees to approximately +90 degrees with the vehicle body length direction set as the reference direction (0 degree, taking the right side of the vehicle body length direction as the positive angle side). By setting the detection range of the front radar 5 as described above, the front radar 5 can detect the other vehicle 20. In addition, if a wall 60 is provided on a side of the non-priority road 40 near the intersection 50 as shown in FIG. 2A, the front radar 5 can detect the other vehicle 20 when the front end of the host vehicle 2 is positioned close to the priority road 30. A Laser Imaging Detection and Ranging (LIDAR) or the like may be used as the front radar 5 instead of the millimeter-wave radar. The front radar 5 outputs a detection result to the ECU 7.

The rear radar (a rear detection unit) 6 is a sensor that detects an object in the rear of the host vehicle 2 at a predetermined interval. The "rear" side here is a side where a rear end of the vehicle body is positioned when viewed from the driver's seat. In other words, the "rear" side is a side where the rear end of the vehicle body is positioned with respect to the vertical plane that passes through the center of the vehicle body and extends in the vehicle width direction of the host vehicle 2. A detection angle of the rear radar 6 can be varied up to plus-minus 90 degrees with the vehicle body length direction set as a reference direction (0 degree, taking the right side of the vehicle body length direction as a positive angle side). The rear radar 6 is a millimeter-wave radar, for example. A plurality of millimeter-wave radars may be combined as the rear radar 6. When the millimeter-wave radar is employed as the rear radar 6, the millimeter-wave radar is provided on the rear end of the host vehicle 2. FIG. 2B shows an example of a detection range of rear radar 6 of the host vehicle 2. In this example, two millimeter-wave radars are provided on the rear end of the host vehicle 2, and each radar has the detection range of the detection angle from approximately −60 degrees to approximately +60 degrees with the vehicle body length direction set as the reference direction (0 degree, taking the right side of the vehicle body length direction as the positive angle side). In the scene shown in FIG. 2B, the rear radar 6 can detect the other vehicle 20. The predetermined interval is set to 50 milliseconds or 100 milliseconds, for example. A LIDAR or the like may be used as the rear radar 6 instead of the millimeter-wave radar. The rear radar 6 output a detection result to the ECU 7.

The ECU 7 includes a central processing unit (CPU), a read only memory (ROM), a random access memory (RAM), and the like. In the ECU 7, a program stored in the ROM is loaded into the RAM and then executed by the CPU. The ECU 7 thus performs a acceleration-deceleration control and others. The ECU 7 may be constructed of a plurality of electronic control units (ECUs).

The ECU 7 includes a direction change determination unit 10, an other vehicle recognition unit (recognition unit) 11, a support determination unit 12, and a support unit 13.

The direction change determination unit 10 determines whether the host vehicle 2 is making a direction change (the host vehicle 2 is changing direction) by turning right or left.

The direction change determination unit 10 determines whether the host vehicle 2 is making the changing direction by turning right or left, based on the turn signal operation information output from the turn signal operation detection unit 3 and the steering angle information output from the steering angle sensor 4. The direction change determination unit 10 determines that the host vehicle 2 is making the direction change when, for example, a condition that the turn signal lever is operated to turn on the turn signal and a condition that a steering angle is equal to or larger than a threshold are both satisfied. The direction change determination unit 10 may determine that the host vehicle 2 is changing direction when a condition that the turn signal lever is operated to turn on the turn signal and a condition that a steering angle falls within a predetermined angle range are both satisfied. The direction change determination unit 10 may additionally use a current position information received from a GPS receiver (not shown in the drawings) and road information obtained from a map database (not shown in the drawings) to determine whether the host vehicle 2 is making the direction change by turning right or left. In this case, the direction change determination unit 10 may use at least one of the turn signal operation information output from the turn signal operation detection unit 3 and the steering angle information output from the steering angle sensor 4. The direction change determination unit 10 may determine whether the host vehicle 2 is making the direction change based on the turn signal operation information output from the turn signal operation detection unit 3, the current position information received from the GPS receiver, and the road information obtained from the map database. When a condition that the turn signal lever is operated to turn on the turn signal and a condition that a current position corresponds to an intersection are both satisfied, the direction change determination unit 10 may determine that the host vehicle 2 starts the direction change by turning right or left, that is, the host vehicle 2 is making the direction change.

The other vehicle recognition unit 11 recognizes a state of another vehicle 20 in a specific scene, based on the detection result of the front radar 5 obtained before or during the direction change. When the direction change determination unit 10 determines that the host vehicle 2 is making the direction change by turning right or left, the other vehicle recognition unit 11 recognizes a state of the other vehicle 20 based on the detection result of the front radar 5 obtained before or during the direction change. For example, the other vehicle recognition unit 11 uses, as the detection result of the front radar 5 obtained before the direction change, the detection result of the front radar 5 obtained a predetermined time before the determination that the host vehicle 2 is making the direction change (or starts the direction change) is made to recognize the state of the other vehicle 20. In addition, the other vehicle recognition unit 11 uses, as the detection result of the front radar 5 obtained during the direction change, the detection result of the front radar 5 obtained while the determination that the host vehicle 2 is making the direction change is being made to recognize the state of the other vehicle 20. The other vehicle recognition unit 11 may recognize the state of the other vehicle 20 based on both the detection result obtained before the direction change and the detection result during the direction change. Here, the other vehicle 20 travels on the priority road 30 toward the intersection 50, and will follow the host vehicle 2 as the following vehicle after the host vehicle 2 completes the direction change (see FIGS. 2A and 2B). The state of the other vehicle 20 refers to a travel state of the other vehicle 20 or an estimated travel state of the other vehicle 20. Specifically, the state of the other vehicle 20 includes a speed, an acceleration, a deceleration, a travel position, and an estimated amount of time (TTC) before contact between the host vehicle 2 and the other vehicle 20. Each of the speed, the acceleration, the deceleration, and the travel position may be an estimated value. The TTC is obtained by dividing a distance (a relative position) between the host vehicle 2 and the other vehicle 20 in an advancement direction of the host vehicle 2 by a relative speed between the host vehicle 2 and the other vehicle 20 in the advancement direction. In the embodiment, however, the TTC is calculated before the direction change by tuning right or left, so the advancement direction of the host vehicle 2 is different from that of the other vehicle 20. Hence, as described below, the TTC is calculated based on an assumption that the advancement direction of the host vehicle 2 coincides with that of the other vehicle 20.

The other vehicle recognition unit 11 may recognize the state of the other vehicle 20 based on both the detection result of the front radar 5 obtained before or during the direction change and the detection result of the rear radar 6 obtained after the direction change. Specifically, the other vehicle recognition unit 11 may use the detection result of the front radar 5 in a situation shown in FIG. 2A, and use the detection result of the rear radar 6 in a situation shown in FIG. 2B. With this configuration, the other vehicle recognition unit 11 can obtain more information about an object as compared with a case where the other vehicle recognition unit 11 uses only the detection result of the front radar 5. Thus, accuracy in recognizing the other vehicle 20 is increased.

The support determination unit 12 determines whether the host vehicle 2 needs the rear-side support in relation to the state of the other vehicle 20, based on the recognition result of the other vehicle recognition unit 11. The support determination unit 12 determines that the host vehicle 2 needs the rear-side support when, for example, a condition that the TTC is smaller than an activation threshold (a predetermined threshold) is satisfied. On the other hand, the support determination unit 12 determines that the host vehicle 2 does not need the rear-side support when the condition that the TTC is smaller than the activation threshold is not satisfied. The predetermined threshold is set in advance to determine whether the host vehicle 2 needs the rear-side support. The predetermined threshold is set to 2 seconds, for example. The support determination unit 12 outputs a determination result to the support unit 13.

The support unit 13 provides the rear-side support based on the determination result. For example, the support unit 13 performs at least one the control to turn on the hazard lamp (to blink the light), the control to adjust the position of the headrest to the rear-side support corresponding position, the activation preparation control for the airbag, and the seat belt pretensioner control.

The driving support device 1 is constructed of the front radar 5, the other vehicle recognition unit 11, and the support determination unit 12. Alternatively, the driving support device 1 may further include the support unit 13.

Figure 3:
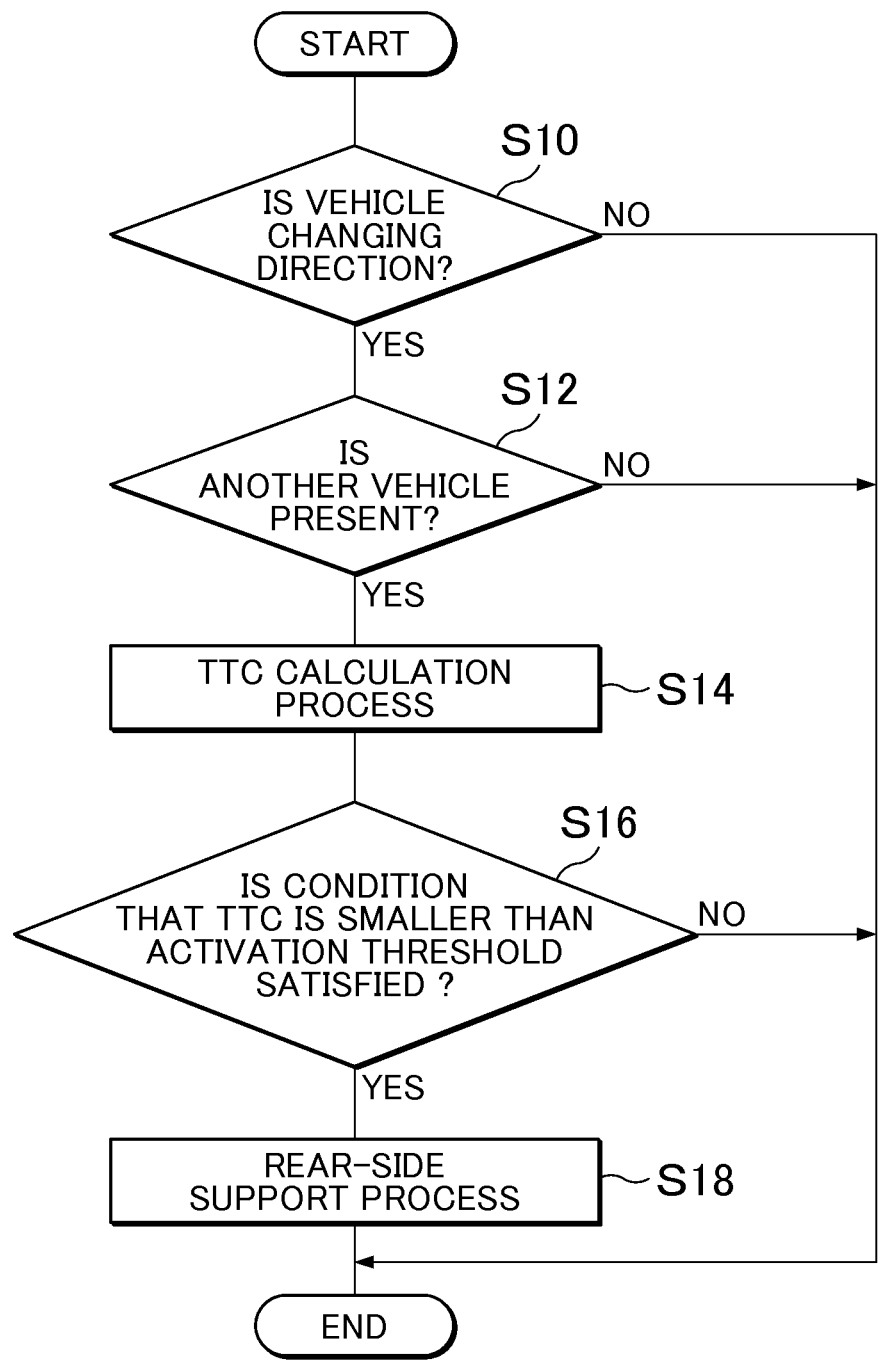
FIG. 3 is a flowchart of a rear-side support need determination process.

Next, a rear-side support need determination process according to the embodiment will be described. FIG. 3 is a flowchart of the rear-side support need determination process. The control process shown in FIG. 3 is performed repeatedly at a predetermined interval after a rear-side support system monitor start time has arrived. The control process shown in FIG. 3 may be performed in the scene in which the host vehicle 2 reaches the intersection 50 and makes the direction change by turning right or left to enter the priority road 30 from the non-priority road 40, as shown in FIG. 2A.

As shown in FIG. 3, the direction change determination unit 10 first determines whether the host vehicle 2 is making the direction change (step S10). For example, the direction change determination unit 10 determines that the host vehicle is making the direction change by turning left when a condition that the turn signal operation information output from the turn signal operation detection unit 3 indicates a left turn and a condition that the steering angle information output from the steering angle sensor 4 indicates a steering angle larger than a threshold are both satisfied. When it is determined that the host vehicle 2 is making the direction change, the control process proceeds to an other vehicle presence determination process (step S12).

As the other vehicle presence determination process in step S12, the other vehicle recognition unit 11 determines whether the other vehicle 20 traveling on the priority road 30 is present. When it is determined that the other vehicle 20 is present, the control process proceeds to a TTC calculation process (step S14).

Figure 4A:
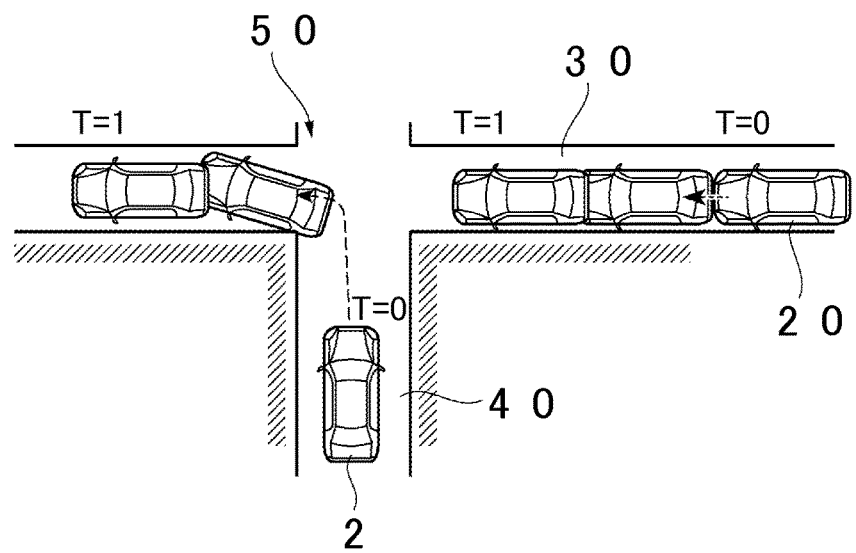
FIGS. 4A and 4B are illustrations that show a process of calculating a TTC.
Figure 4B:
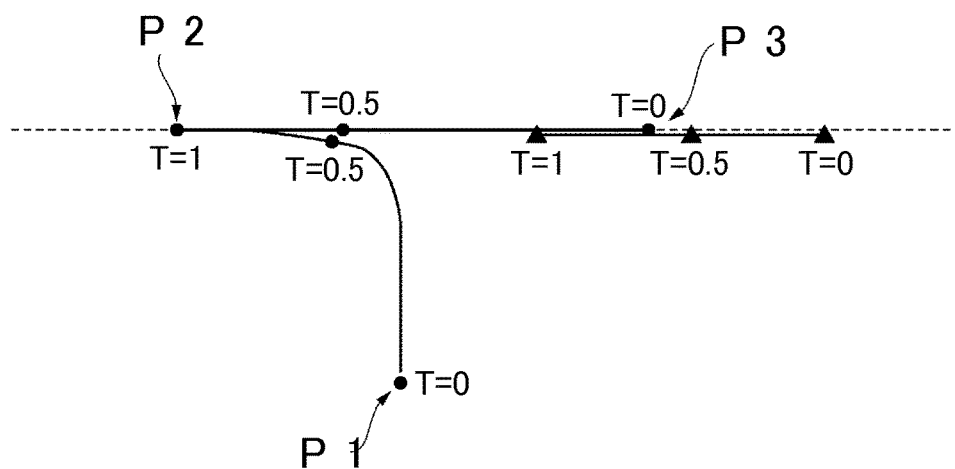

As the TTC calculation process in step S14, the other vehicle recognition unit 11 calculates the TTC based on an assumption that the host vehicle 2 and the other vehicle 20 travel on the same road (the priority road 30). FIGS. 4A and 4B are illustrations that show a process of calculating the TTC. FIG. 4A shows a scene in which the rear-side support is provided, and FIG. 4B schematically shows travel paths of the host vehicle 2 and the other vehicle 20 in the scene shown in FIG. 4A. In FIG. 4B, the travel paths of the host vehicle 2 and the other vehicle 20 until 1 second has elapsed from when the host vehicle 2 starts the direction change at a point P1 (0 second). In the embodiment, the TTC is calculated based on an assumption that the direction change has been completed in 1 second, with reference to a driver's history (a travel history and/or an operation history). However, the TTC may be calculated based on an assumption that the direction change has been completed in X seconds, with reference to the driver's history.

The other vehicle recognition unit 11 obtains a shape of the intersection 50 from the map database, and predicts the travel path from the current point P1 to an end point P2 on the priority road 30 where the host vehicle 2 reaches in 1 second, using information about the current point P1 obtained from the GPS receiver. The end point P2 on the priority road 30 where the host vehicle 2 reaches in 1 second is set based on a speed of the host vehicle 2 at the current point P1 and/or the driver's history. Next, the other vehicle recognition unit 11 calculates a length of the travel path. Here, the other vehicle recognition unit 11 assumes that the host vehicle 2 is positioned at a point P3 on the priority road 30 away from the end point P2 by a distance corresponding to the calculated length of the travel path. In this way, the host vehicle 2 and the other vehicle 20 are assumed to be positioned on the same line. With this assumption, the other vehicle recognition unit 11 calculates the estimated amount of time to the contact between the host vehicle 2 and the other vehicle 20, based on the relative speed between the host vehicle 2 and the other vehicle 20.

Back to FIG. 3, the control process proceeds to a TTC determination process (step S16) after the other vehicle recognition unit 11 calculates the TTC. As the TTC determination process in step S16, the support determination unit 12 determines whether the host vehicle 2 needs the rear-side support. The support determination unit 12 determines that the host vehicle 2 needs the rear-side support when, for example, a condition that the TTC is smaller than the activation threshold is satisfied. When it is determined that the host vehicle need the rear-side support, the control process proceeds to a rear-side support process (step S18). In the rear-side support process in step S18, the support unit 13 provides the rear-side support. The control process shown in FIG. 3 is terminated when the rear-side support is completed.

On the other hand, the direction change determination unit 10 determines that the host vehicle 2 is not making the direction change in step S10 when a condition that the turn signal operation information output from the turn signal operation detection unit 3 indicate a right or left turn, or a condition that the steering angle information output from the steering angle sensor 4 indicates a steering angle larger than the threshold is not satisfied. When it is determined that the host vehicle 2 is not making the direction change, the control process shown in FIG. 3 is terminated. When it is determined that the other vehicle 20 is not present in the other vehicle presence determination process in step S12, the control process shown in FIG. 3 is also terminated. Further, when the condition that the TTC is smaller than the activation threshold is not satisfied in the TTC determination process in step S16, which means that the host vehicle 2 does not need the rear-side support, the control process shown in FIG. 3 is terminated. That is, in any case described above, the rear-side support is not provided in relation to the other vehicle 20 traveling on the priority road 30.

Figure 5A:
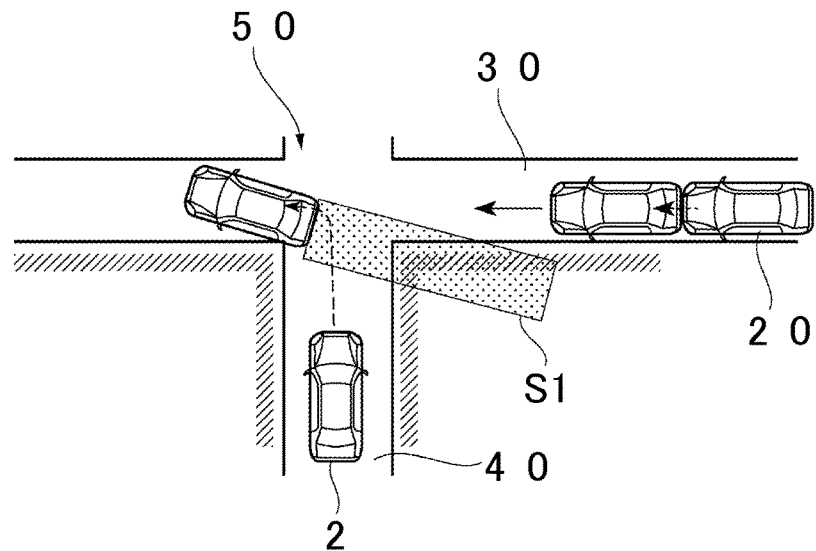
FIGS. 5A and 5B are illustrations that show a conventional rear-side support need determination process.
Figure 5B:
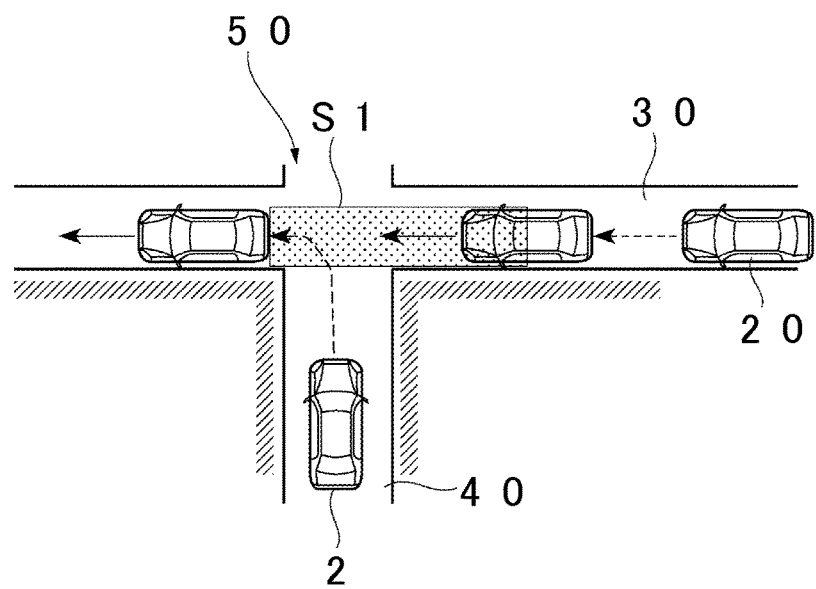

As described above, with the control process shown in FIG. 3, the determination as to whether the host vehicle 2 needs the rear-side support in relation to the other vehicle 20 traveling on the priority road 30 is made based on the detection result of the front radar 5 before or during the direction change. Hereinafter, operation and advantages according to the driving support device 1 will be described as compared with the conventional rear-side support determination. FIGS. 5A and 5B are illustrations that show a conventional rear-side support need determination. An example shown in FIGS. 5A and 5B uses only the rear radar 6 to determine whether the host vehicle 2 needs the rear-side support. FIG. 5A shows the host vehicle 2 during a left turn, and FIG. 5B shows the host vehicle 2 immediately after the left turn. In FIG. 5A, a rear-side support activation range S1 smaller than the detection range of the rear radar 6 shown in FIG. 2B is set. The rear-side support for the host vehicle 2 is provided when an object detected by the rear radar 6 enters the rear-side support activation range S1. Thus, in a situation shown in FIG. 5A, the other vehicle 20 is not determined as an object that triggers the rear-side support. Note that, in consideration of reduction in erroneous activation, it is difficult to expand the rear-side support activation range S1 to a range wider than a lane width.

As shown in FIG. 5B, after the host vehicle 2 completes the left turn, the other vehicle 20 becomes the following vehicle of the host vehicle 2 and enters the rear-side support activation range S1. At this time, the other vehicle 20 approaching the host vehicle 2 is positioned inside the border of the rear-side support activation range S1. In the usual scene where the other vehicle 20 approaches the host vehicle 2 from behind, the rear-side support is started when the other vehicle 20 reaches the border of the rear-side support activation range S1. However, in the scene shown in FIGS. 5A and 5B, the rear-side support is started when the other vehicle 20 is positioned closer to the host vehicle, inside the border of the rear-side support activation range S1. As a result, a timing at which the rear-side support is provided is delayed.

In this respect, the other vehicle recognition unit 11 in the driving support device 1 according to the embodiment recognizes the state of the other vehicle 20, which becomes the following vehicle of the host vehicle 2 after the host vehicle 2 completes the direction change, based on the detection result of the front radar 5 obtained before or during the direction change. Thus, the state of the other vehicle 20 can be recognized earlier as compared to a case where the state of the other vehicle 20 is recognized by a detection unit with a detection range set in the rear of the host vehicle 2. Then, the support determination unit 12 determines whether the host vehicle 2 needs the rear-side support in relation to the state of the other vehicle 20, based on the recognition result of the other vehicle recognition unit 11. Thus, the state of the other vehicle 20 recognized earlier is used to determine whether the host vehicle 2 needs the rear-side support. This makes it possible to determine whether the host vehicle 2 needs the rear-side support earlier. As a result, the rear-side support can be provided earlier.

A driving support device according to a second embodiment has substantially the same configuration as that of the driving support device 1 according to the first embodiment. The second embodiment differs from the first embodiment only in that an estimated deceleration of another vehicle 20 is used to determine whether a host vehicle needs a rear-side support, instead of a TTC. Hereinafter, differences from the first embodiment will be mainly described while duplicate explanations will be omitted.

Figure 6:
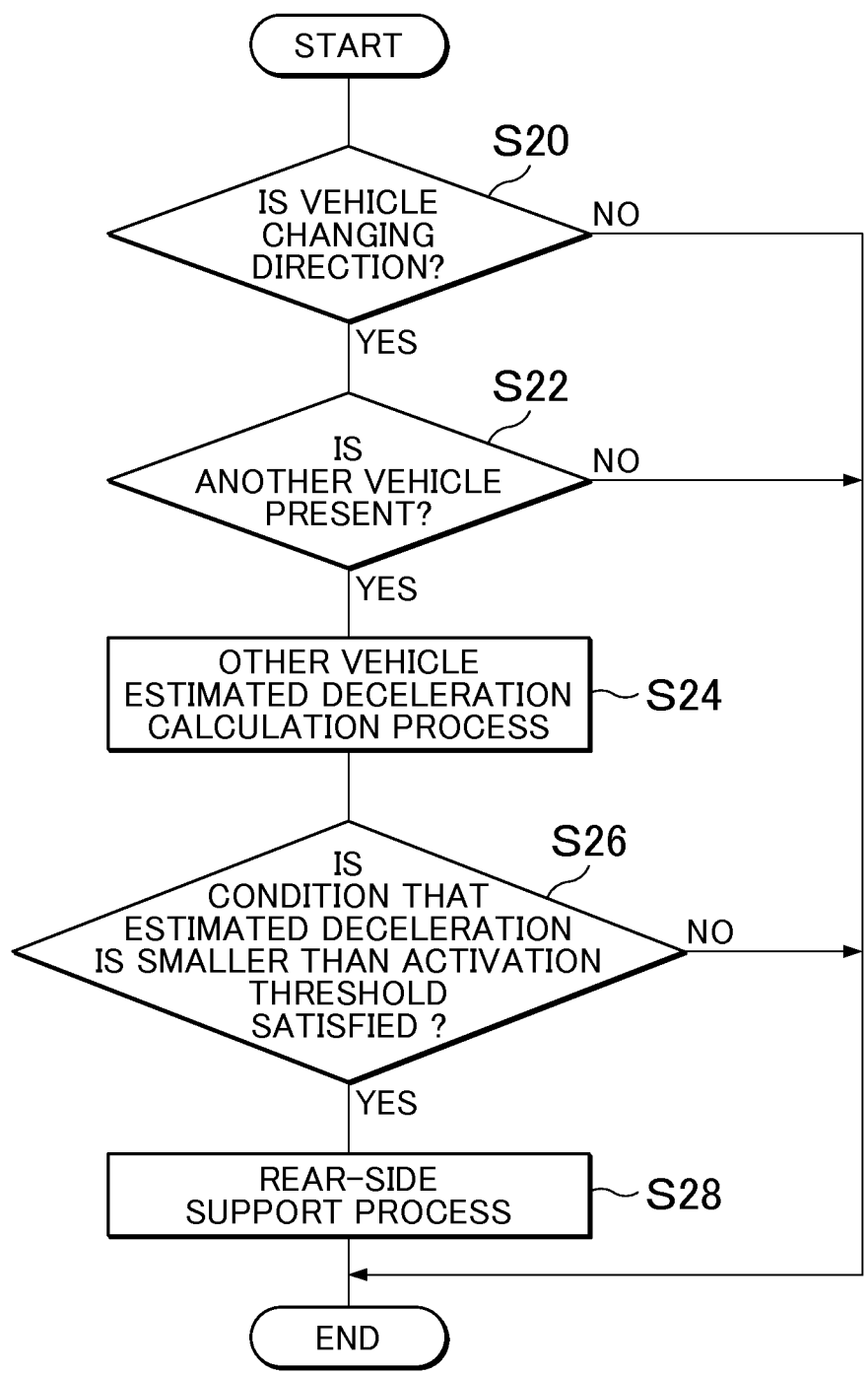
FIG. 6 is a flowchart of a rear-side support need determination process performed by a driving support device according to a second embodiment.

FIG. 6 is a flowchart of a rear-side support need determination process performed by the driving support device according to the second embodiment. The control process shown in FIG. 6 is performed repeatedly at a predetermined interval after a rear-side support system monitor start time has arrived. The control process shown in FIG. 6 may be performed in the scene in which the host vehicle 2 reaches the intersection 50 and makes the direction change by turning right or left to enter the priority road 30 from the non-priority road 40, as shown in FIG. 2A.

Processes in steps S20 and S22 shown in FIG. 6 are the same as those in steps S10 and S12 shown in FIG. 3. When the other vehicle 20 is detected by the front radar 5, the control process proceeds to an estimated deceleration calculation process (step S24).

Figure 7:
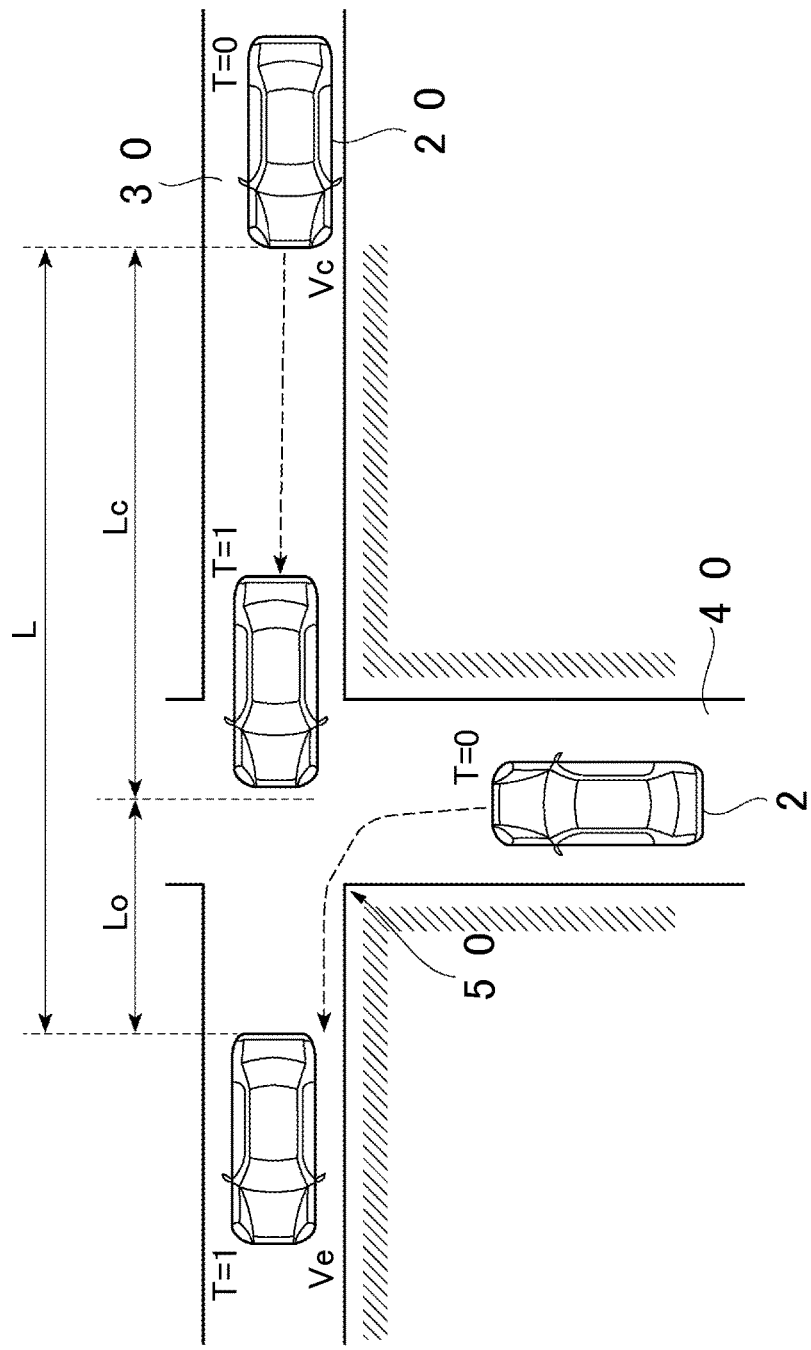
FIG. 7 is an illustration that shows a process of calculating an estimated deceleration.

As the estimated deceleration calculation process in step S24, the other vehicle recognition unit 11 calculates the estimated deceleration based on the state of the other vehicle 20 and a predicted behavior of the host vehicle 2. FIG. 7 is an illustration that shows a process of calculating the estimated deceleration. In a scene shown in FIG. 7, the estimated deceleration is calculated based on an assumption that the direction change has been completed after 1 second has elapsed from the current time (T=0 second), with reference to the driver's history. Alternatively, the estimated deceleration may be calculated based on an assumption that the direction change has been completed after X seconds has elapsed from the current time, with reference to the driver's history. In the scene shown in FIG. 7, the other vehicle 20 needs to be positioned away from the host vehicle 2 at least by a safety margin distance in 1 second (T=1 second). Accordingly, when a distance L denotes a distance between a point on the priority road 30 at which the host vehicle 2 is positioned in 1 second (T=1 second) and a point on the priority road 30 at which the other vehicle 20 is currently (T=0 second) positioned, a distance (an advancement allowed distance Lc) by which the other vehicle 20 is allowed to advance during 1 second is obtained by subtracting the distance Lo from the distance L (L−Lo). Further, the relative speed between the host vehicle 2 and the other vehicle 20 should be made smaller than 0 while the other vehicle 20 travels the advancement allowed distance Lc. That is, when a speed Ve denotes a speed of the host vehicle 2 at the point on the priority road 30 at which the host vehicle 2 completes the direction change (T=1 second), a speed of the other vehicle 20 in 1 second (T=1 second) has to be smaller than the speed Ve (Condition 1). In addition, the speed of the other vehicle 20 has to become smaller than the speed Ve while the other vehicle travels the advancement allowed distance Lc (Condition 2). The estimated deceleration of the other vehicle 20 is calculated using the above Conditions 1 and 2.

Back to FIG. 6, after the other vehicle recognition unit 11 calculates the estimated deceleration, the control process proceeds to an estimated deceleration determination process (step S26). As the estimated deceleration determination process in step S26, the support determination unit 12 determines whether the host vehicle 2 needs the rear-side support. For example, the estimation deceleration smaller than an activation threshold means a sudden braking to be performed in the other vehicle 20, so the support determination unit 12 determines that the host vehicle needs the rear-side support when a condition that the estimated deceleration is smaller than the activation threshold is satisfied. When it is determined that the host vehicle 2 needs the rear-side support, the control process proceeds to a rear-side support process (step S28). In the rear-side support process in step S28, the support unit 13 provides the rear-side support. As the rear-side support, for example, the support unit 13 performs the control to turn on the hazard lamp, thereby prompting the other vehicle 20 to perform an early braking. The control process shown in FIG. 6 is terminated when the rear-side support is completed.

On the other hand, when the condition that the estimated deceleration is smaller than the activation threshold is not satisfied in the estimated deceleration determination process in step S26, which means that the host vehicle 2 does not need the rear-side support, the control process shown in FIG. 6 is terminated. In a case where a negative determination is made in step S20 or S22, a process similar to the process in step S10 or S12 shown in FIG. 3 is performed. That is, in any case described above, the rear-side support is not provided in relation to the other vehicle 20 traveling on the priority road 30.

Thus, with driving support device according to the embodiment, the rear-side support can be provided earlier and a possibility of a sudden braking to be performed in the other vehicle 20 can be reduced.

A driving support device according to a third embodiment differs from the driving support device 1 according to the first embodiment in that a support determination unit 12A uses information obtained by the rear radar 6 to determine whether the host vehicle 2 needs the rear-side support. The other configuration of the driving support device according to the third embodiment is the same as that according to the first embodiment. Hereinafter, differences from the driving support device 1 according to the first embodiment will be mainly described while duplicate explanations will be omitted.

Figure 8:
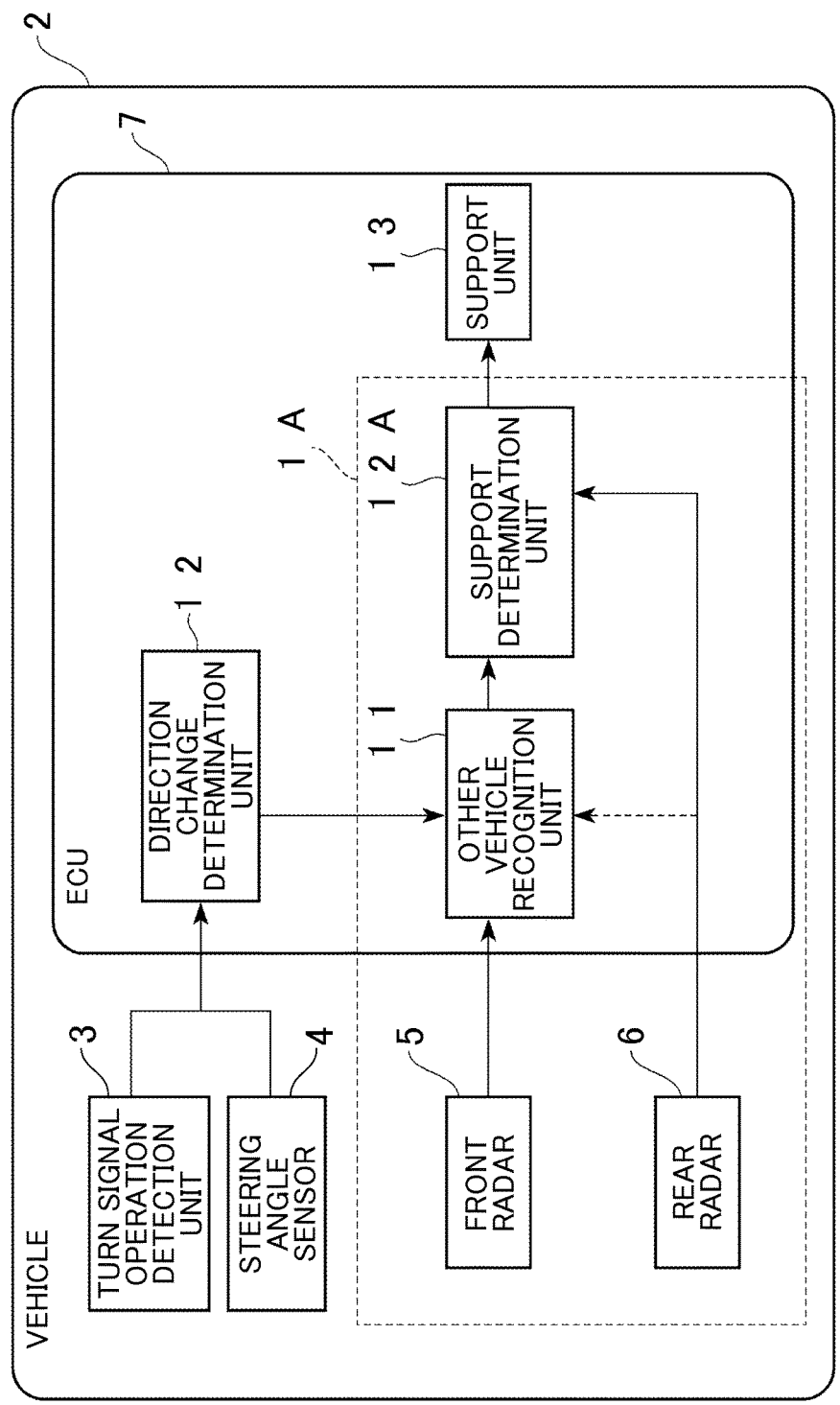
FIG. 8 is a schematic diagram that illustrates functions of a driving support device according to a third embodiment.

FIG. 8 is a schematic diagram that illustrates functions of the driving support device according to the third embodiment. As shown in FIG. 8, the driving support device 1A includes the front radar 5, the rear radar 6, the other vehicle recognition unit 11, and the support determination unit 12A. Alternatively, the driving support device 1A may further include the support unit 13.

The rear radar 6 performs periodic detection operation as described above. The other vehicle recognition unit 11 counts a successive detection number as the number of times the other vehicle 20 is detected successively by the rear radar 6, based on information output from the rear radar 6. The other vehicle recognition unit 11 then outputs the counted successive detection number to the support determination unit 12A. The support determination unit 12A determines that the host vehicle 2 needs the rear-side support at least when a condition that the successive detection number is larger than a first threshold is satisfied. The first threshold is a predetermined threshold for determining whether the detection result of the rear radar 6 is reliable. That is, the detection result of the rear radar 6 is determined to be reliable when a condition for the successive detection number is satisfied. On the other hand, in a case where the other vehicle recognition unit 11 has recognized that the other vehicle 20 is present before, the support determination unit 12A determines that the host vehicle 2 needs the rear-side support at least when a condition that the successive detection number is larger than a second threshold is satisfied. The second threshold is smaller than the first threshold. The other configuration of the driving support device according to the third embodiment is the same as that according to the first embodiment.

Figure 9:
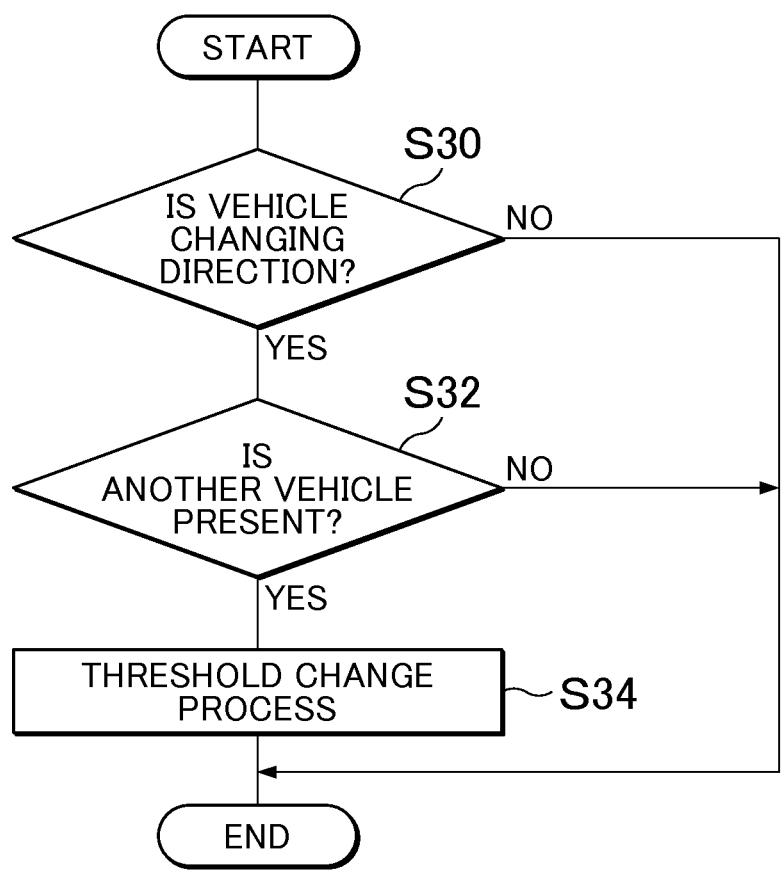
FIG. 9 is a flowchart of a threshold change process.

Next, operation of the driving support device 1A according to the embodiment will be described. First, a threshold change process for changing a threshold of the successive detection number from the first threshold to the second threshold will be described. FIG. 9 is the flowchart of the threshold change process. The control process shown in FIG. 9 is performed repeatedly at a predetermined interval after a rear-side support system monitor start time has arrived. The control process shown in FIG. 9 may be performed in the scene in which the host vehicle 2 reaches the intersection 50 and makes the direction change by turning right or left to enter the priority road 30 from the non-priority road 40, as shown in FIG. 2A.

Processes in steps S30 and S32 shown in FIG. 9 are the same as those in steps S10 and S12 shown in FIG. 3. When the other vehicle 20 is detected by the front radar 5, the control process proceeds to the threshold change process (step S34).

As the threshold change process in step S34, the support determination unit 12A changes the threshold of the successive detection number from the first threshold to the second threshold, which is smaller than the first threshold. For example, when the first threshold is set to 10 times, the threshold of the successive detection number is changed to the second threshold set to 5 times. The control process shown in FIG. 9 is terminated when the process in step S34 is completed.

On the other hand, when it is determined that the host vehicle 2 is not making the direction change in step S30 or when it is determined that the other vehicle 20 is not present in step S32, the control process shown in FIG. 9 is terminated without changing the threshold of the successive detection number.

Figure 10:
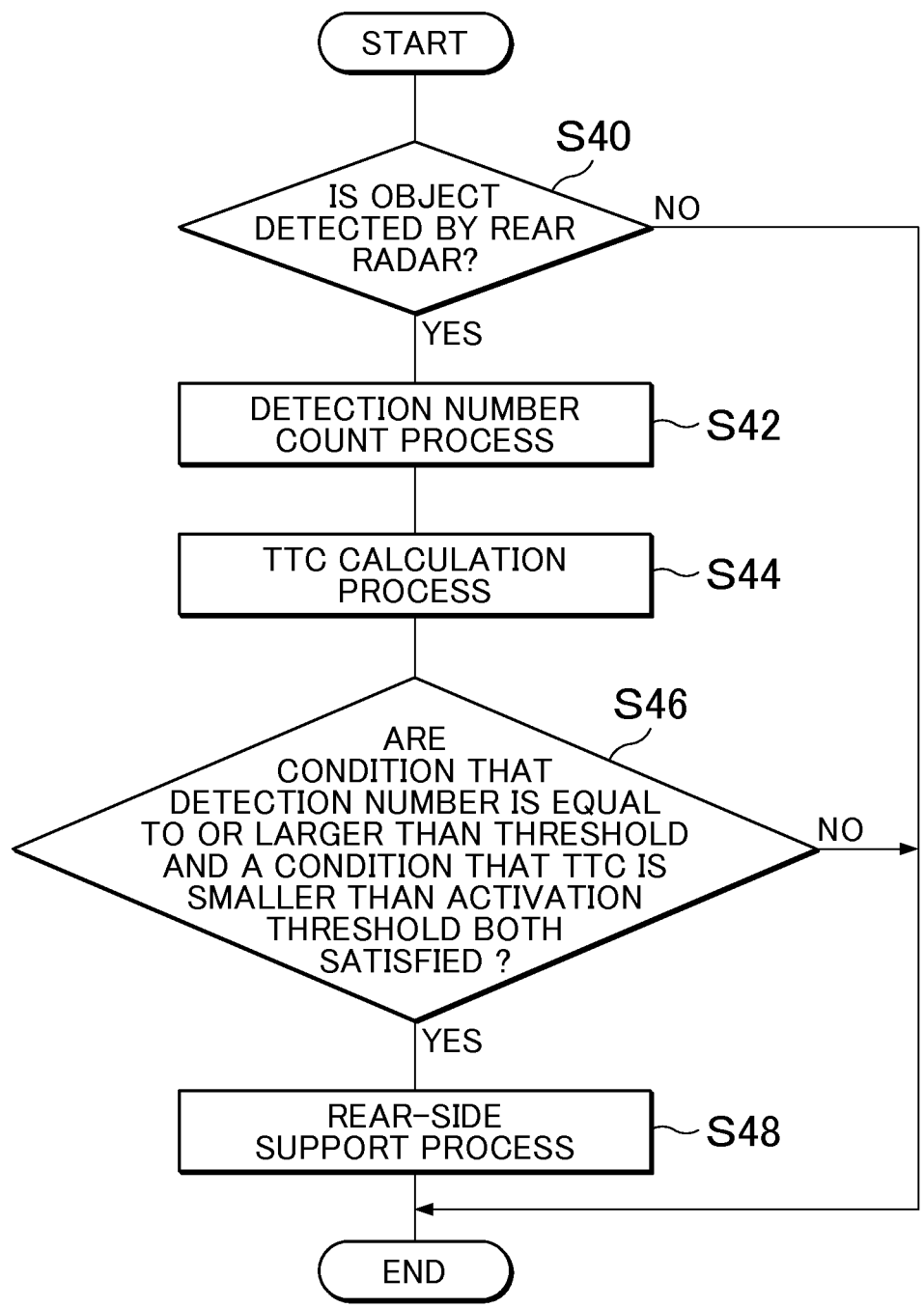
FIG. 10 is a flowchart of a rear-side support need determination process.

Next, a rear-side support need determination process performed by the driving support device 1A will be described. FIG. 10 is a flowchart of the rear-side support need determination process. The control process shown in FIG. 10 starts at a predetermined timing, which is set regardless of scenes, and is performed repeatedly thereafter.

As shown in FIG. 10, the other vehicle recognition unit 11 first determines whether the rear radar 6 detects an object (step S40). When it is determined that the rear radar 6 detects an object, the control process proceeds to a count process (step S42).

As the count process in step S42, the other vehicle recognition unit 11 counts the successive detection number. When the process in step S42 is completed, the control process proceeds to a TTC calculation process (step S44). As the TTC calculation process in step S44, the other vehicle recognition unit 11 calculates the TTC based on the detection result of the rear radar 6. When the process in step S44 is completed, the control process proceeds to a rear-side support need determination process (step S46).

As the rear-side support need determination process in step S46, the support determination unit 12A determines that the host vehicle 2 need the rear-side support when a condition that the successive detection number is larger than the threshold and a condition that the TTC is larger than an activation threshold are both satisfied. The threshold of the successive detection number here is set in the control process shown in FIG. 9. Specifically, the first threshold is used when the other vehicle recognition unit 11 does not recognize the other vehicle 20 with the front radar 5, and the second threshold is used when the other vehicle recognition unit 11 recognizes the other vehicle 20 with the front radar 5. When it is determined that the host vehicle 2 needs the rear-side support in step S46, a rear-side support process is performed (step S48). The process in step S48 is the same as that in step S18.

On the other hand, when an object is not detected in the process in step S40 or when it is determined that the host vehicle 2 does not need the rear-side support in the process in step S46, the control process shown in FIG. 10 is terminated.

As described above, when the other vehicle recognition unit 11 has recognized the other vehicle 20 before based on the detection result of the front radar 5, it can be assumed that the other vehicle 20 is detected with a certain degree of reliability. Thus, in this case, the threshold of the successive detection number, which serves as the threshold for performing the rear-side support, is reduced in the driving support device 1A according to the embodiment. This makes it possible to provide the rear-side support earlier as compared before the threshold of the successive detection number is changed.

The invention is not limited to the driving support devices in the above described embodiments.

For example, although an object is detected by the front radar 5 in the above described embodiments, a sensor other than the front radar 5 may be used to detect an object. An image sensor such as a camera may be used to detect an object instead of the front radar 5.

In addition, although the rear-side support for the host vehicle 2 is provided at the intersection 50 between the priority road 30 and the non-priority road 40, the rear-side support may be provided at a location other than the intersection 50. The rear-side support may be provided at a tree-way junction (a T junction) or a merging point. That is, the invention may be applied to any rear-side support provided at a junction where the two roads are joined to each other.

What is claimed is:
1. A driving support device for a host vehicle that travels on a first road and makes a direction change, at a junction between the first road and a second road, by turning right or left to enter the second road from the first road, the driving support device comprising:

a front detection unit configured to detect an object in front of the host vehicle;

a rear detection unit configured to detect an object in a rear of the host vehicle, wherein the rear detection unit is configured to periodically detect the object in the rear of the host vehicle at a predetermined interval;

a recognition unit configured to recognize a state of another vehicle that travels on the second road toward the junction and that follows the host vehicle as a following vehicle after the host vehicle completes the direction change, based on a first detection result of the front detection unit obtained before or during the direction change and a second detection result of the rear detection unit obtained after the direction change, wherein the recognition unit is configured to count a successive detection number as a number of times the rear detection unit detects the other vehicle successively; and a support determination unit configured to determine whether the host vehicle needs a rear-side support in relation to the state of the other vehicle, based on a recognition result of the recognition unit, wherein the support determination unit is configured to determine that the host vehicle needs the rear-side support at least based on the successive detection number being larger than a first threshold in a case where the recognition unit does not recognize that the other vehicle is present based on the first detection result of the front detection unit, wherein the support determination unit is configured to determine that the host vehicle needs the rear-side support at least based on the successive detection number being larger than a second threshold in another case where the recognition unit recognizes that the other vehicle is present based on the first detection result of the front detection unit, wherein the support determination unit is configured to change a threshold of the successive detection number from the first threshold to the second threshold based on the recognition unit recognizing that the other vehicle is present based on the first detection result of the front detection unit, and wherein the second threshold is smaller than the first threshold.

2. The driving support device according to claim 1, wherein the rear-side support is a support that operates one of the host vehicle and an in-vehicle device mounted in the host vehicle before contact between the host vehicle and the other vehicle so as to avoid the contact or reduce an impact of the contact.

3. The driving support device according to claim 2, wherein the rear-side support for the host vehicle includes at least one of a control to turn on a hazard lamp, a control to adjust a position of a headrest to a rear-side support corresponding position, an activation preparation control for an airbag, and a seat belt pretensioner control.

4. The driving support device according to claim 1, wherein:

the state of the other vehicle includes an estimated amount of time before contact between the host vehicle and the other vehicle; and the support determination unit is configured to determine that the host vehicle needs the rear-side support based on a condition that the estimated amount of time before the contact is smaller than a predetermined threshold is satisfied.

5. The driving support device according to claim 1, further comprising a direction change determination unit configured to determine whether the host vehicle is making the direction change, wherein the direction change determination unit is configured to determine whether the host vehicle is making the direction change based on information indicating turn signal operation and information indicating a steering angle.

6. The driving support device according to claim 1, further comprising a support unit configured to provide the rear-side support when the support determination unit determines that the host vehicle needs the rear-side support.

7. A driving support method for a host vehicle that travels on a first road and makes a direction change, at a junction between the first road and a second road, by turning right or left to enter the second road from the first road, the driving support method comprising:

detecting an object in front of the host vehicle;

detecting an object in a rear of the host vehicle periodically at a predetermined interval;

recognizing a state of another vehicle that travels on the second road toward the junction and that follows the host vehicle as a following vehicle after the host vehicle completes the direction change, based on a first result of detecting the object obtained before or during the direction change and a second result of detecting the object obtained after the direction change;

counting a successive detection number as a number of times the other vehicle is successively detected in the rear of the host vehicle;

determining whether the host vehicle needs a rear-side support in relation to the state of the other vehicle, based on a result of recognizing the state of the other vehicle;

determining that the host vehicle needs the rear-side support at least based on the successive detection number being larger than a first threshold in a case where the other vehicle is not recognized based on the first result;

determining that the host vehicle needs the rear-side support at least based on the successive detection number being larger than a second threshold in another case where the other vehicle is recognized based on the first result; and changing the threshold of the successive detection number from the first threshold to the second threshold, which is smaller than the first threshold, based on recognizing that the other vehicle is present based on the first result.

8. The driving support method according to claim 7, further comprising providing the rear-side support when it is determined that the host vehicle needs the rear-side support.

9. A method, comprising:

determining, by an electronic control unit (ECU) of a vehicle, that the vehicle is making a direction change, at a junction between a first road and a second road, by turning right or left to enter the second road from the first road;

determining, by the ECU of the vehicle, whether another vehicle is present on the second road based on a detection result, of a front detection unit of the vehicle, obtained before or during the direction change;

selectively changing, by the ECU of the vehicle, a threshold of a successive detection number from a first threshold to a second threshold, that is different than the first threshold, based on determining whether the other vehicle is present on the second road;

counting, by the ECU of the vehicle, the successive detection number as a number of times a rear detection unit of the vehicle detects the other vehicle; and determining, by the ECU of the vehicle, whether the vehicle needs a rear-side support based on the successive detection number and the threshold of the successive detection number and based on selectively changing the threshold of the successive detection number.

\* \* \* \* \*